(12) United States Patent
Hikichi

(10) Patent No.: US 12,143,546 B2
(45) Date of Patent: Nov. 12, 2024

(54) INFORMATION PROCESSING APPARATUS, METHOD FOR CONTROLLING THE SAME, AND STORAGE MEDIUM TO FACILITATE POWER-SAVING PROCESSING

(71) Applicant: CANON KABUSHIKI KAISHA, Tokyo (JP)

(72) Inventor: Atsushi Hikichi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/298,216

(22) Filed: Apr. 10, 2023

(65) Prior Publication Data
US 2023/0344949 A1 Oct. 26, 2023

(30) Foreign Application Priority Data
Apr. 21, 2022 (JP) .................. 2022-070113

(51) Int. Cl.
*H04N 1/00* (2006.01)
(52) U.S. Cl.
CPC ..... *H04N 1/00888* (2013.01); *H04N 1/00899* (2013.01)

(58) Field of Classification Search
None
See application file for complete search history.

(56) References Cited

U.S. PATENT DOCUMENTS

2015/0256698 A1* 9/2015 Hamaguchi ........ H04N 1/00917
358/1.13

FOREIGN PATENT DOCUMENTS

JP 6280397 B2 2/2018

* cited by examiner

*Primary Examiner* — Lennin R Rodriguezgonzalez
(74) *Attorney, Agent, or Firm* — Canon U.S.A., Inc. I.P. Division

(57) ABSTRACT

An information processing apparatus for making state transition between a plurality of power states including a suspend state includes one or more controllers having one or more processors and one or more memories. The one or more controllers is configured to function as a control unit configured to, in a case where a state transition to the suspend state fails, inhibit the state transition to the suspend state and then perform a shutdown.

9 Claims, 13 Drawing Sheets

INFORMATION PROCESSING APPARATUS, METHOD FOR CONTROLLING THE SAME, AND STORAGE MEDIUM TO FACILITATE POWER-SAVING PROCESSING

BACKGROUND

Field

The present disclosure generally relates to power control of an information processing apparatus.

Description of the Related Art

Image forming apparatuses implement low power consumption based on a suspend technique for deactivating peripheral devices and shifting central processing units (CPUs) to a deactivated state (OFF or Wait For Interrupt (WFI)) while energizing memories. When an image forming apparatus uses no device, it performs suspend processing in a standby mode to enter a sleep state. When the image forming apparatus receives a sleep restoration event notification in the sleep state, it performs resume processing to return to the standby mode.

Image forming apparatuses implement low power consumption based on a hibernation technique for storing memory and register information in a nonvolatile storage device and then turning peripheral devices and CPUs OFF.

The suspend and hibernation techniques are used according to the user's application and convenience, and contribute to the power saving of image forming apparatuses.

Japanese Patent No. 6280397 discusses a technique for shutting down upon reception of a specific error from a drive unit of a scanner, a printer, or the like during suspend processing.

If a hardware failure occurs, the image forming apparatus performs device deactivation processing in power-saving processing such as suspend or hibernation.

If some devices fail and processing delays, suspend processing of the devices takes time, and the user may be unable to use the system for a prolonged period of time.

For example, if write processing to some blocks does not immediately complete during the suspend processing of a nonvolatile storage device as one of devices, the user is forced to wait until a time-out occurs. In this case, the nonvolatile storage device may be deactivated by canceling write processing on a defective block or by performing read and write processing to recover the defective block. However, if the defective block of the nonvolatile storage device is not recovered or if the nonvolatile storage device cannot detect the block failure, the user is forced to wait in minutes because of suspend retry processing and is unable to use the system, resulting in degraded user's convenience. If device suspend processing fails, suspend processing for the entire system may also fail, resulting in a user response delay.

Process deactivation processing is performed in power-saving processing such as suspend or hibernation. If a process is performing system processing in this case, suspend processing for the process takes time, and the user may be unable to use the system for a prolonged period of time.

For example, network transmission and reception processes perform a series of communication protocol processes including outputting data in the transmit buffer to the opposite apparatus and receiving a response in the receive buffer. In this case, the transmit and the receive buffers become busy and hence suspend processing for the processes and for device drivers used by the processes fail until the transmission and reception for the buffers are completed. If process suspend processing fails, suspend processing for the entire system may also fail, resulting in a user response delay.

If power-saving processing such as suspend or hibernation fails, continuous failures may possibly occur. However, there has been problems of retry on the power-saving processing, a prolonged user response time, and incomplete processing.

It would be beneficial to overcome the above-described problems caused by continuous failures in power-saving processing such as suspend.

SUMMARY

According to some embodiments, an information processing apparatus for making state transition between a plurality of power states including a suspend state includes one or more controllers having one or more processors and one or more memories. The one or more controllers is configured to function as a control unit configured to, in a case where a state transition to the suspend state fails, inhibit the state transition to the suspend state and then perform a shutdown.

Further features of the present disclosure will become apparent from the following description of exemplary embodiments with reference to the attached drawings.

DESCRIPTION OF THE EMBODIMENTS

An image forming apparatus includes a plurality of apparatuses constructing a system. If a hardware failure occurs, the image forming apparatus performs device deactivation processing in power-saving processing such as suspend or hibernation.

The present disclosure provides advantageous features to solve problems caused by continuous failures in power-saving processing such as suspend. For example, the present disclosure enables preventing the occurrence of an event that the operating state cannot be restored even upon reception of a return instruction from the user during retry of the power-saving processing and an event that the power-saving processing does not complete. This makes it possible to improve usability.

Various exemplary embodiments, features, and aspects of the present disclosure will be described below with reference to the accompanying drawings.

The present disclosure is applicable to a system composed of a plurality of apparatuses, to an apparatus composed of one device, or to other configurations.

The present disclosure is not limited to the above-described exemplary embodiments but can be modified in diverse ways (including organic combinations of these exemplary embodiments) based on the spirit and scope of the present disclosure. These modifications are not excluded from the scope of the present disclosure. More specifically, all of configurations derived by suitably combining the above-described exemplary embodiments and modifications thereof are also intended to be included in the present disclosure.

<System Configuration>

Figure 1:
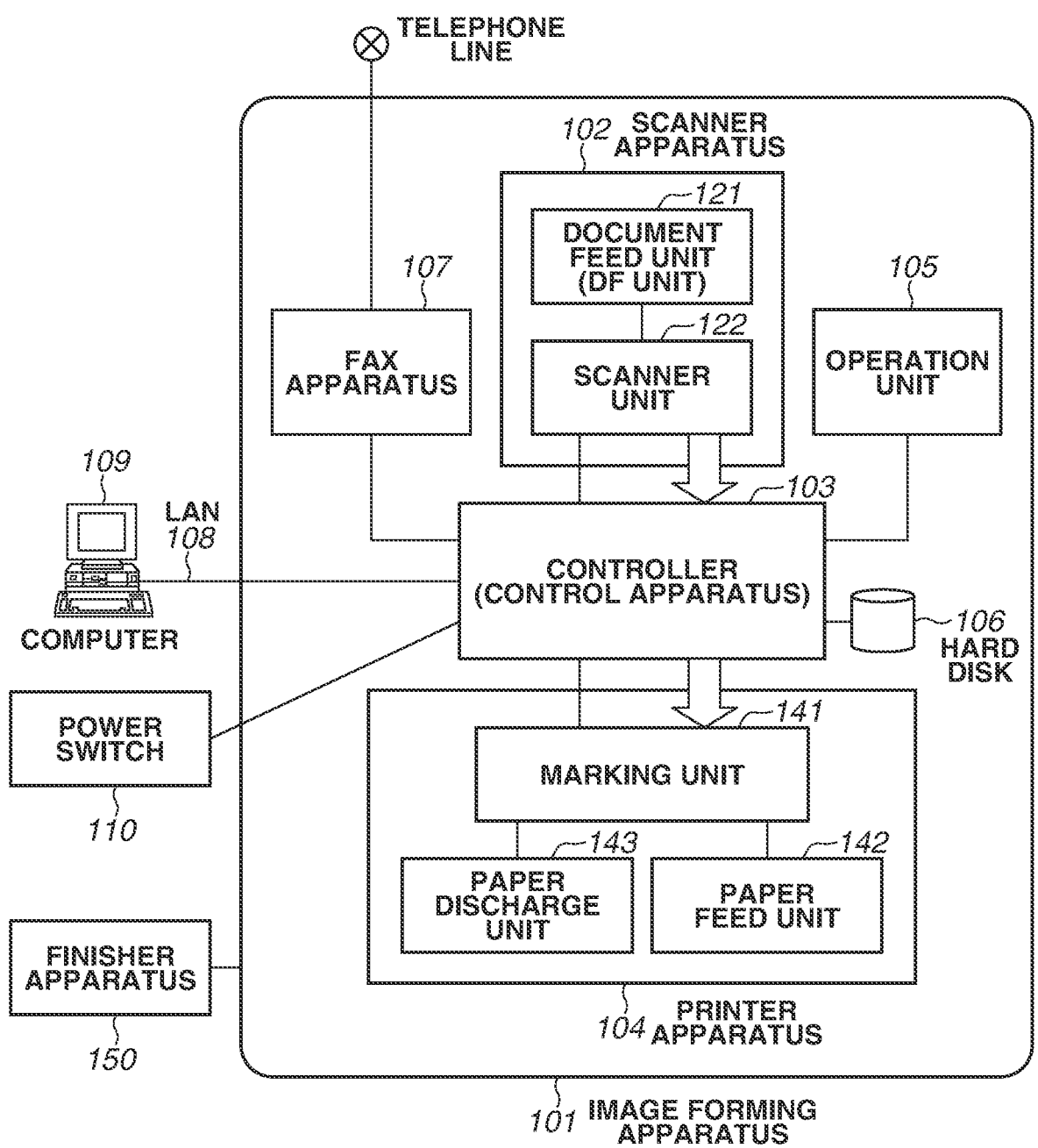
FIG. 1 illustrates an image forming system according to the present exemplary embodiment.

FIG. 1 illustrates an example configuration of an image forming system according to some embodiments. A first exemplary embodiment will be described below centering on a multifunction peripheral having print, scanner, and data communication functions.

Referring to FIG. 1, an image forming apparatus 101 is configured to receive a job from a computer 109 via a local area network (LAN) 108. One or more computers may be connected.

In the image forming apparatus 101, a scanner apparatus 102 optically reads an image from a document and converts it into a digital image. A printer apparatus 104 outputs the digital image to a paper device called paper. An operation unit 105 includes a touch panel and hardware keys for receiving settings for the apparatus 101 from the user and displaying the processing state. A hard disk (HDD) 106 stores digital images and control programs. The HDD 106 is a nonvolatile storage device, and may be a Solid State Drive (SSD) or an embedded Multi Media Card (eMMC). A facsimile (FAX) apparatus 107 transmits and receives digital images to/from a telephone line. A controller 103 is connected to the scanner apparatus 102, the printer apparatus 104, the operation unit 105, the hard disk 106, and the FAX apparatus 107, and issues instructions to different modules to execute a job on the image forming apparatus 101. The controller 103 includes one or more processors, circuitry, or combinations thereof, and implements functions of the image forming apparatus 101 and components contained therein by executing a computer program stored in the HDD 106 or other memory.

The image forming apparatus 101 can also communicate digital images with the computer 109 via the LAN 108, issue jobs, and instruct the apparatuses.

The scanner apparatus 102 includes a document feed unit 121 for automatically and sequentially changing document bundles, and a scanner unit 122 for optically scanning a document and converting it into a digital image. The image data converted by the scanner unit 122 is transferred to the controller 103.

The printer apparatus 104 includes a paper feed unit 142 for feeding sheets of paper one by one from the paper bundle, a marking unit 141 for printing image data on the fed paper, and a paper discharge unit 143 for discharging the paper after printing. A finisher apparatus 150 subjects the paper device output from the paper discharge unit 143 of the printer apparatus 104 of the image forming apparatus 101 to paper discharge, sorting, and processing such as stapling, punching, and cutting.

The image forming apparatus 101 is provided with a power switch 110 for controlling power supply. When the power switch 110 is turned OFF, the image forming apparatus 101 waits for software and hardware termination process, and stops supplying power to portions except for the portions used to detect the ON state of the power switch 110.

<System Functions>

Examples of executable jobs (functions) of the image forming apparatus 101 will be described below.

[Copy Function]

The image forming apparatus 101 is provided with a copy function of recording an image read from the scanner apparatus 102 in the hard disk 106 and at the same time printing the image by using the printer apparatus 104.

[Image Transmission Function]

The image forming apparatus 101 is provided with an image transmission function of transmitting an image read from the scanner apparatus 102 to the computer 109 via the LAN 108.

[Image Storage Function]

The image forming apparatus 101 is provided with an image storage function of recording an image read from the scanner apparatus 102 in the hard disk 106, and transmitting and printing the image as desired.

[Image Print Function]

The image forming apparatus 101 is provided with an image print function of analyzing, for example, a page description language transmitted from the computer 109 and printing data on the printer apparatus 104.

<Configuration of Operation Unit 105>

The operation unit 105 is connected to the controller 103. The operation unit 105 includes a liquid crystal display (LCD) touch panel, a power-saving button, a copy button, a cancel button, a reset button, a numeric keypad, and user mode keys to provide a user interface (I/F) for operating an image input/output system. These keys include hardware keys (not essential) and software keys displayed on the LCD.

<Block Diagram of Controller 103>

The block diagram of the controller 103 and peripheral apparatuses will be described below with reference to FIG. 2.

Figure 2:
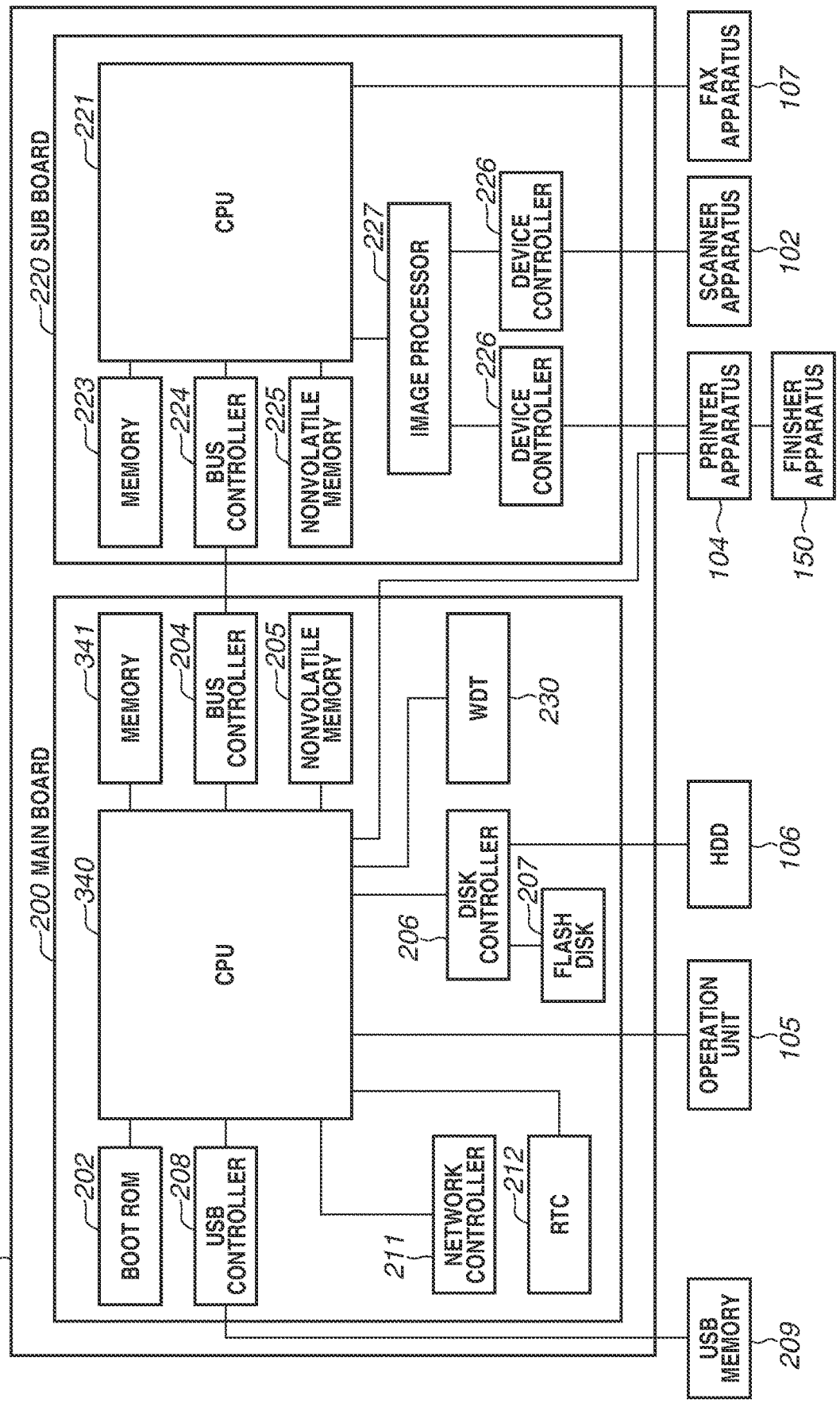
FIG. 2 illustrates a configuration of a controller included in an image forming apparatus according to the present exemplary embodiment.

FIG. 2 illustrates an example configuration of the controller 103.

The controller 103 includes a main board 200 and a sub board 220.

The main board 200 is what is called a general-purpose CPU system.

The main board 200 includes a CPU 340 for controlling the entire board, a boot read only memory (ROM) 202 including a boot program, and a memory 341 used as a work memory by the CPU 340. The main board 200 also includes a bus controller 204 having a bridge function of connecting with an external bus, a nonvolatile memory 205 that retains data even after power is turned OFF, and a watchdog timer (WDT) 230 for resetting the controller 103. The CPU 340 includes one or more processors, circuitry, or combinations thereof, and controls the WDT 230.

The main board 200 also includes a disk controller 206 for controlling a storage device, and a flash disk 207 such as an SSD or an eMMC. The flash disk 207 is a storage device including semiconductor devices, having a comparatively small capacity.

The main board 200 further includes a Universal Serial Bus (USB) controller 208 for controlling USB devices and a real-time clock (RTC) 212.

The main board 200 is connected with external devices such as a USB memory 209, the operation unit 105, and the hard disk 106.

The sub board 220 includes a relatively small general-purpose CPU system and an image processing hardware component.

The sub board 220 includes a CPU 221 for controlling the entire board, a memory 223 used as a work memory by the CPU 221, a bus controller 224 having a bridge function of connecting with an external bus, and a nonvolatile storage device 225 that retains data even after power is turned OFF. The CPU 221 includes one or more processors, circuitry, or combinations thereof.

The sub board 220 further includes an image processor 227 for performing real-time digital image processing and a device controller 226.

The scanner apparatus 102 and the printer apparatus 104 externally connected with the controller 103 communicate digital image data via the device controller 226. The paper device discharged from the printer apparatus 104 is processed by the finisher apparatus 150. The FAX apparatus 107 is directly controlled by the CPU 221.

FIG. 2 is a block diagram schematically illustrating the controller 103. For example, the CPUs 340 and 221 include many CPU peripheral hardware components such as a chip set, a bus bridge, and a clock generator. However, since these hardware components are not needed on a granularity basis, the block configuration is simply illustrated, and does not limit the present disclosure.

The operation of the controller 103 will be described below centering on an example of copying an image on a paper device.

When the user issues an image copy instruction from the operation unit 105, the CPU 340 transmits an image read instruction to the scanner apparatus 102 via the CPU 221. The scanner apparatus 102 optically scans a paper document, converts it into digital image data, and inputs the data to the image processor 227 via the device controller 226. The image processor 227 temporarily stores the digital image data in the memory 223 via Direct Memory Access (DMA) transfer via the CPU 221. When the CPU 340 confirms that a predetermined amount or all of the digital image data has been stored in the memory 223, the CPU 340 issues an image output instruction to the printer apparatus 104 via the CPU 221. The CPU 221 informs the image processor 227 of the address of the image data in the memory 223. The image data in the memory 223 is transmitted to the printer apparatus 104 via the image processor 227 and the device controller 226 according to a synchronization signal from the printer apparatus 104. The printer apparatus 104 prints the digital image data on the paper device. When a plurality of copies is to be printed, the CPU 340 stores the image data of the memory 223 in the hard disk 106. For the second and subsequent copies, it is possible to transmit image data from the hard disk 106 and the memory 223 to the printer apparatus 104 without receiving image data from the scanner apparatus 102.

<Power Source Configuration>

Figure 3:
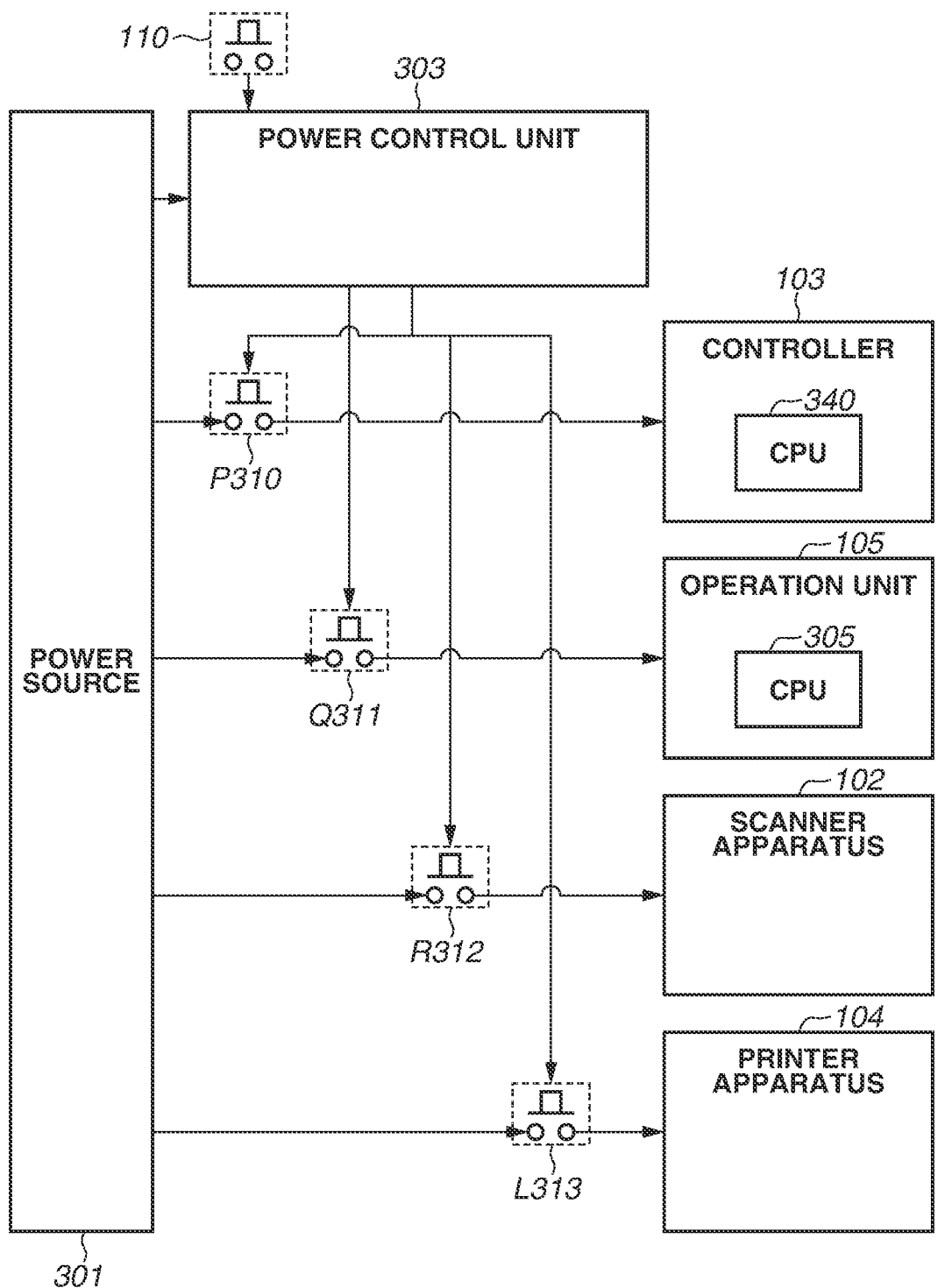
FIG. 3 illustrates a power source configuration of the image forming apparatus according to the present exemplary embodiment.

FIG. 3 is a block diagram illustrating the power source configuration of the image forming apparatus 101.

Of the configurations of a power source 301, a power control unit 303, the controller 103, the operation unit 105, the scanner apparatus 102, and the printer apparatus 104 in the image forming apparatus 101, elements related to the present disclosure will be described below with reference to FIG. 3.

The power control unit 303 is constantly supplied with power from the power source 301 via a power line.

However, when power is turned OFF, only the power control unit 303 is energized for power control since the power control unit 303 consumes very small power.

In the image forming apparatus 101, when the power switch 110 is pressed, the power control unit 303 detects the depression. When the power control unit 303 detects the depression of the power switch 110, the power control unit 303 controls a power switch P310 to supply power to the CPU 340 of the controller 103. Likewise, the power control unit 303 controls a power switch Q311 to supply power to a CPU 305 of the operation unit 105, controls a power switch R312 to supply power to the scanner apparatus 102, and controls a power switch L313 to supply power to the printer apparatus 104.

The CPU 340 of the controller 103 instructs the power control unit 303 to control the power switch Q311 to supply power from the power source 301 to the CPU 305 of the operation unit 105. Likewise, the CPU 340 controls the power switch R312 to separately supply power from the power source 301 to the scanner apparatus 102, and controls the power switch L313 to separately supply power from the power source 301 to the printer apparatus 104. In this case, the marking unit 141, the paper feed unit 142, and the paper discharge unit 143 of the printer apparatus 104 can be separately subjected to power control. However, descriptions of this processing will be omitted since it is not the main subject.

The block-based power supply as illustrated in FIG. 3 is implemented by using, for example, two different systems of the power switch P310. In the sleep state, only the power switches connected to the blocks to be subjected to power OFF are turned OFF, and other power switches are left ON. In the shutdown state, the power switches of both systems are turned OFF. In this case, power control signals are not binary signals but multi-valued control signals according to the energized state. Particularly in this example, descriptions of these signals will be omitted. In the above-described power states including the sleep and shutdown states, the power supply is implemented under the above-described control. This control may be implemented in any desired form. For example, the power control unit 303 may subject the power switch P310 to multi-valued control to supply power to each block of the controller 103. Alternatively, the CPU 340 of the controller 103 may instruct the power control unit 303 to subject the power switch P310 to multi-valued control to supply power to each block of the controller 103. Although, in the present exemplary embodiment, the power switches P310, Q311, R312, and L313 are relay switches, these switches are not limited to relay switches but may be, for example, silicon switches.

<Power States and Power State Transitions>

Figure 4:
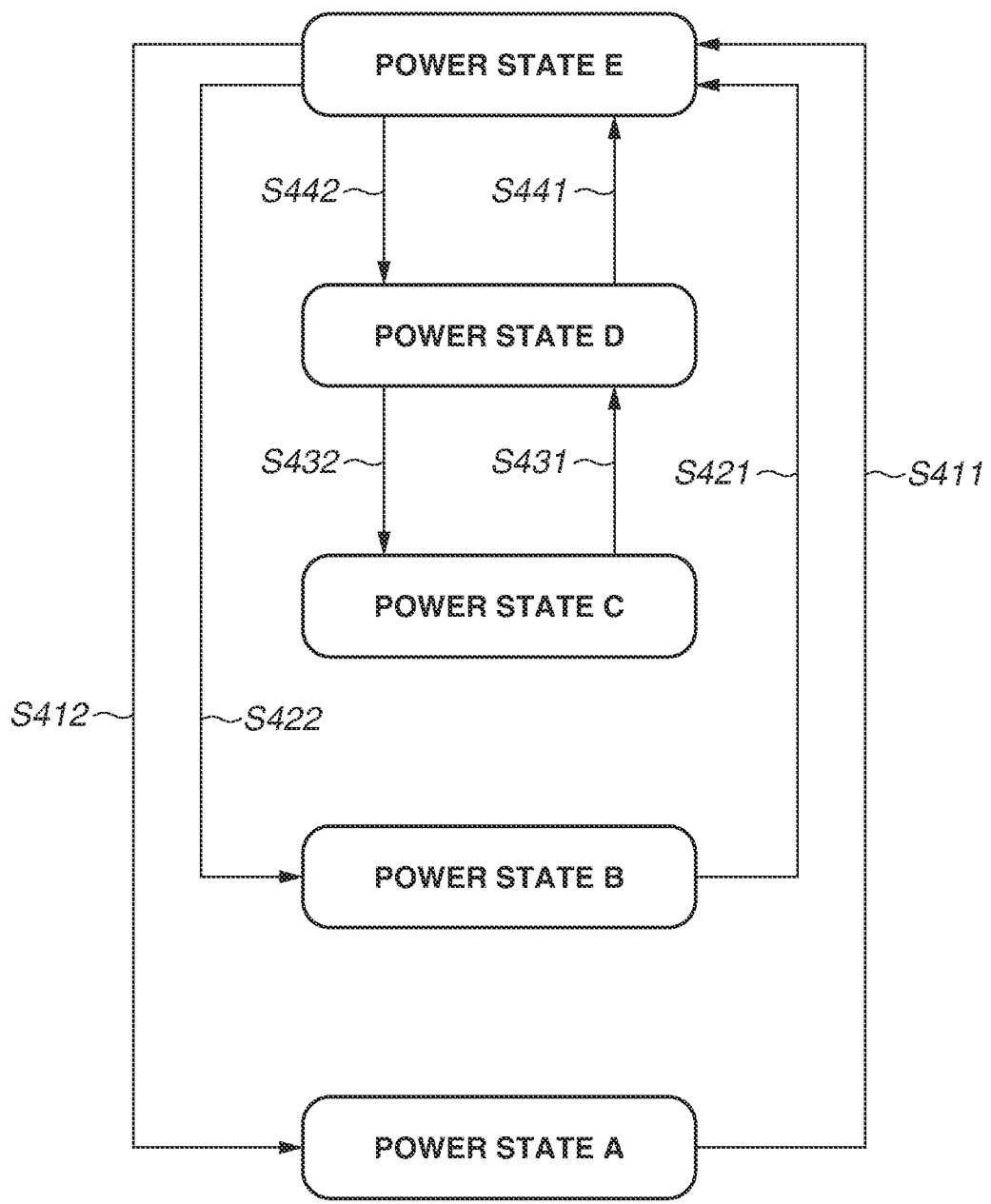
FIG. 4 illustrates power states and state transitions of the image forming apparatus according to the present exemplary embodiment.

FIG. 4 illustrates five different power states and state transitions of the system according to the present exemplary embodiment.

The five different power states will be described below. The five different power states include a power state A, a power state B, a power state C, a power state D, and a power state E in ascending order of the power consumption.

The power state A is one of states where the power switch is OFF, and corresponds to a cold-off state. In this power state, functional portions that receive a signal notification of power switch ON are energized.

The power state B is one of states where the power switch is OFF, and corresponds to the OFF state called suspend or hibernation in the high-speed activation mode, from which the apparatus can rapidly return. In this power state, functional portions that receive a signal notification of power switch ON and functional portions such as memories (in case of suspend) are energized.

The power state C is one of states where the power switch remains ON, and corresponds to a deep sleep state. In this power state, functional portions such as memories used in Wait For Interrupt (WFI) and suspend (with energized CPUs and memories) are energized.

The power states B and C belong to suspend.

The power state D is one of states where the power switch remains ON, and corresponds to a light sleep state. In this power state, a user interface (UI) screen is OFF, and functional portions using the CPUs and memories are energized.

The power state E is a standby or operating state where the power switch is ON. In this power state, the UI screen is turned ON, the CPUs and memories are energized, and functional blocks used by the printer apparatus 104, the scanner apparatus 102, and the FAX 107 are energized. In this state, the operation unit 105 is assumed to be turned ON but may be turned OFF during printing.

Power transitions between the above-described five different power states will be described below.

<Power Supply at Activation: State Transition from Power State A to Power State E>

When an operator uses the image forming apparatus 101 in the power state A, the operator turns ON the power switch 110. Accordingly, the activation processing of the image forming apparatus 101 is started.

The activation processing of the image forming apparatus 101 will be described below.

When the power control unit 303 detects the power ON state based on the power switch 110, the power control unit 303 turns ON the power switches P310, Q311, R312, and L313 by using power switch control signals.

Accordingly, the power source 301 supplies power to the entire apparatus 101, i.e., the controller 103, the operation unit 105, the scanner apparatus 102, and the printer apparatus 104 via different direct current (DC) power supply channels. This means that the apparatus 101 enters the power state E. When the controller 103, the printer apparatus 104, and the scanner apparatus 102 are supplied with power, their CPUs start the initialization operations.

In this case, the power control unit 303 may perform fine power supply control on the controller 103 (via the power switch P310), the operation unit 105 (via the power switch Q311), the scanner apparatus 102 (via the power switch R312), and the printer apparatus 104 (via the power switch L313).

For example, the controller 103 can separately supply power to the main board 200, the sub board 220, the network controller 211 of the main board 200 by using a plurality of power switches. This enables differentiating power supply between the sleep state and the high-speed activation mode. For example, in the printer apparatus 104, power may be separately supplied to the CPU, the paper feed unit 142, the marking unit 141, and the paper discharge unit 143. Detailed descriptions of this method will be omitted.

When power is supplied, the CPU 340 of the controller 103 performs the hardware initialization. The hardware initialization includes initializing resisters, initializing interrupts, registering device drivers during kernel activation, and initializing the operation unit 105. Then, the CPU 340 of the controller 103 performs the software initialization. The software initialization includes calling the initialization routine of each library, activating processes and threads, activating software services for communicating with the printer apparatus 104 and the scanner apparatus 102, and drawing a screen on the operation unit 105. Finally, the CPU 340 of the controller 103 enters the standby state.

<Power Supply in Standby State: Power State E>

Power supply in the normal state where the printer apparatus 104 and the scanner apparatus 102 of the image forming apparatus 101 are not used will be described below.

The normal state is not limited to a state where power is supplied to all units. Examples of other normal states include a state where power is not supplied to the printer apparatus 104 when printing is not performed, and a state where power is not supplied to the scanner apparatus 102 when the operation unit 105 is turned OFF and the user is not present in front of the image forming apparatus 101. Examples of other normal states further include an operation standby state where power can be supplied to one or more portions to accelerate the completion of printing by the printer apparatus 104 and the completion of reading by the scanner apparatus 102. Examples of operation standby states include a state where the paper feed unit 142 and the paper discharge unit 143 do not activate the motors and polygon mirror for printing, and a state where the marking unit 141 does not perform temperature adjustment on the transfer unit for printing. Examples of operation standby states further includes a state where the scanner unit 122 does not enable the home position detection for reading.

<Power Supply at Printing: Power State E>

The power supply in a state where the printer apparatus 104 and the scanner apparatus 102 are used during copying and printing (such as Page Description Language (PDL) printing) in the image forming apparatus 101 will now be described.

Turning power of the printer apparatus 104 ON and OFF by using the image print function will be described below.

The CPU 340 of the controller 103 receives data from the computer 109 via the LAN 108 and stores the data in the memory 341. The CPU 340 analyzes the received data and, when the image print function is executed, generates a print job. Then, the CPU 340 instructs the power control unit 303 to change the power switch L313 to supply power from the power source 301 to the printer apparatus 104. When the printer apparatus 104 becomes ready, the CPU 340 executes the print job. The CPU 340 transmits data to the CPU 221 of the sub board 220 via the memory 341, the bus controller 204, and the bus controller 224 of the sub board 220. The CPU 221 further transmits data to the printer apparatus 104 via the image processor 227 and the device controller 226. When the printer apparatus 104 prints the received data and printing is completed, the printer apparatus 104 notifies the CPU 340 of the print result. When printing is completed, the CPU 340 instructs the power control unit 303 to turn OFF the power switch L313 by using a power control signal to turn OFF power of the printer apparatus 104.

<Power Supply in Standby State: State Transitions between Power States E, D, and C>

When a predetermined time has elapsed after completion of a print or scan job or a user operation, then in step S442, the sleep state is entered, i.e., the CPU 340 makes a state transition from the power state E to the power state D.

When the system ends using the printer apparatus 104 via network responses, then in step S432, the CPU 340 makes a state transition from the power state D to the power state C. When the CPU 340 receives a notification such as a network packet in the power state C, then in step S431, the CPU 340 makes a state transition to the power state D. When the network packet is a job, then in step S441, the CPU 340 makes a state transition from the power state D to the power state E and then executes the job.

<Power Supply at Sleep Transition: State Transition from Power State D to Power State C>

Sleep transition processing of the controller 103 will be described below.

The CPU 340 makes a state transition to the sleep state by using an auto sleep timer when the active state without user operations lasts for a predetermined time period, for example, since the user ends copying or a network-based print job is completed. The CPU 340 instructs the power control unit 303 to make a state transition to the sleep state to change the power supply to the controller 103. The CPU 340 controls the power control unit 303 to perform multi-valued control on the power switch P310 to turn OFF each block of the controller 103. The CPU 340 enters an interrupt signal standby state and then enters the sleep state. As described above, the power supply for each block is implemented, for example, by configuring the power switch P310 with two different systems. In the sleep state, only the power switches connected with the blocks to be subjected to power OFF are turned OFF, and other power switches are left ON.

In this case, the CPU 340 instructs the power control unit 303 to turn OFF the power switch Q311 by using a power control signal to interrupt the power supply from the power source 301 to the operation unit 105. Then, the CPU 340 makes a state transition to the sleep state. Alternatively, the CPU 340 instructs the CPU 305 of the operation unit 105 via serial communication to shift the operation panel and peripheral devices to the power-saving state. Then, the CPU 340 makes a state transition to the sleep state.

Also in this case, the CPU 340 instructs the power control unit 303 to turn OFF the power switches R312 and L313 by using power control signals to stop the power supply to the scanner apparatus 102 and the printer apparatus 104. If a print job is not generated or if device information acquisition is not needed, the printer apparatus 104 and the scanner apparatus 102 do not need to be supplied with power except for portions such as sensors used for sleep restoration.

<Power Supply in Sleep State: Power State C>

The sleep state of the image forming apparatus 101 will be described below.

The sleep state refers to the Wait For Interrupt (WFI) standby and the suspend states of the CPU 340 where the activation time can be made shorter than that in the normal activation while restricting the power consumption.

The CPU 340 makes a state transition to the sleep state when a predetermined time has elapsed while the user performs no operation, when the user presses the touch panel or the power-saving key on the operation unit 105 and when a preset time is reached. In the sleep state, power is supplied to the memory 341, an interrupt controller, the network controller 211, the RTC 212, and the USB controller 208 of the controller 103.

Power is also supplied to the power-saving key on the operation unit 105, a part of the FAX apparatus, and various sensors. However, the power supply in the sleep state is not limited to the present configuration since sleep restoration factors differ for each system.

Software operations at the time of sleep restoration will be described below.

The power control unit 303 starts supplying power upon reception of one or more interrupts due to an event of the network, the RTC detecting a timer and alarm, the FAX detecting an incoming call and on-hook, software switches, various sensors, and the USB detecting attachment/detachment and communication. The power control unit 303 notifies the CPU 340 of the cause of interruption, and, upon reception of the notification, the CPU 340 performs processing for restoring the software state to the normal state, i.e., sleep restoration processing.

<Power Supply at Sleep Restoration: State Transition from Power State C to Power State D>

The sleep restoration processing of the controller 103 will be described below.

Upon reception of a power-saving key depression event handler as a sleep restoration factor in the sleep state, the power control unit 303 turns ON the power switch P310 to enable the CPU 340 of the controller 103 to return from the sleep state. In this case, the power control unit 303 can also enable the CPU 340 to return from the sleep state, for example, by subjecting the power switch P310 to multi-valued control to supply power to each block of the controller 103 and then issuing an interrupt signal to the CPU 340. However, descriptions of this sequence will be omitted since it is not the main subject. The CPU 340 instructs the power control unit 303 to turn ON the power switches Q311, R312, and L313 to supply power to the operation unit 105, the scanner apparatus 102, and the printer apparatus 104. Although the power supply to some devices such as the FAX apparatus 107 is not illustrated, signals for these devices (not illustrated) can also be prepared.

<Power Supply in High-Speed Activation Mode: Power State B>

The high-speed activation mode of the image forming apparatus 101 will be described below.

The high-speed activation mode refers the suspend and hibernation states where the activation time can be made shorter than that in the normal activation while restricting the power consumption.

The CPU 340 makes a state transition to the high-speed activation mode when the user turns OFF the power switch and receives a termination process notification from an application or server inside or outside the image forming apparatus 101.

In the high-speed activation mode, the power source 301 supplies power to the memory 341 of the controller 103 and the interrupt controller that receives a power switch ON interrupt. On the other hand, the CPU 340 saves power by shifting devices not to be used as sleep restoration factors in the high-speed activation mode, to the non-energized or reset state. Such devices include the network controller 211, the RTC 212, the USB controller 208, the power-saving key on the operation unit 105, a part of the FAX apparatus 107, and various sensors. However, the power supply in the high-speed activation mode is not limited to the present configuration since factors of the restoration from the high-speed activation mode are different for each system.

Software operations at the time of returning from the high-speed activation mode will be described below.

The power control unit 303 starts supplying power upon reception of an ON-interrupt of the power switch 110 in the high-speed activation mode. The power control unit 303 notifies the CPU 340 of the cause of the interrupt. Upon reception of the notification, the CPU 340 performs processing for restoring the software state to the normal state, i.e., processing for returning from the high-speed activation mode, processing for returning from hibernation, and resume processing from suspend.

<Descriptions of Flowcharts>

According to the first exemplary embodiment, if the deep sleep processing fails, the CPU 340 sets a power-saving disabling flag to inhibit the suspend processing (a state transition to the power states B and C). This configuration will be described in detail below with reference to flowcharts.

Figure 5:
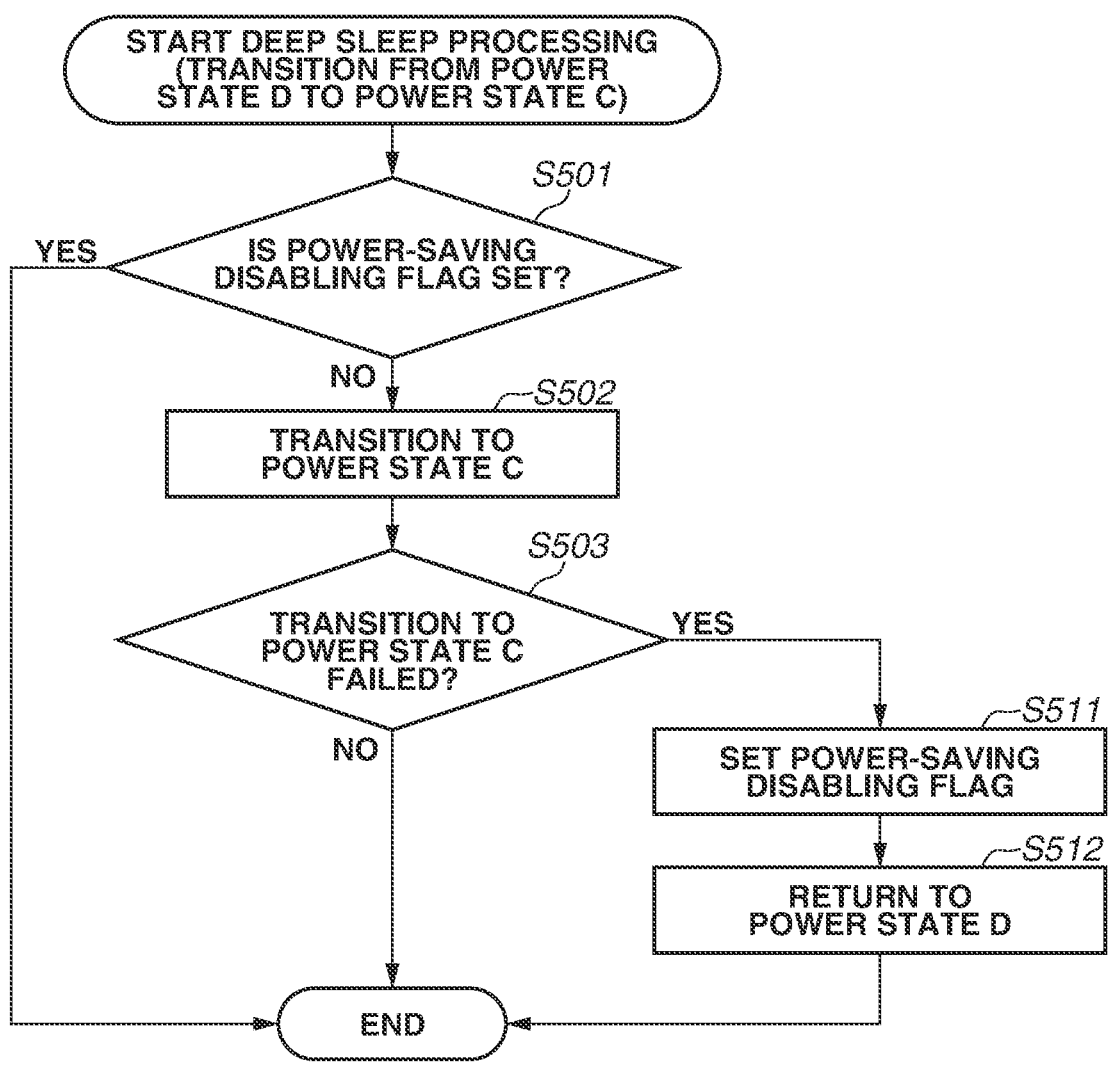
FIG. 5 is a flowchart illustrating an operation of an image forming apparatus according to a first exemplary embodiment.
Figure 6:
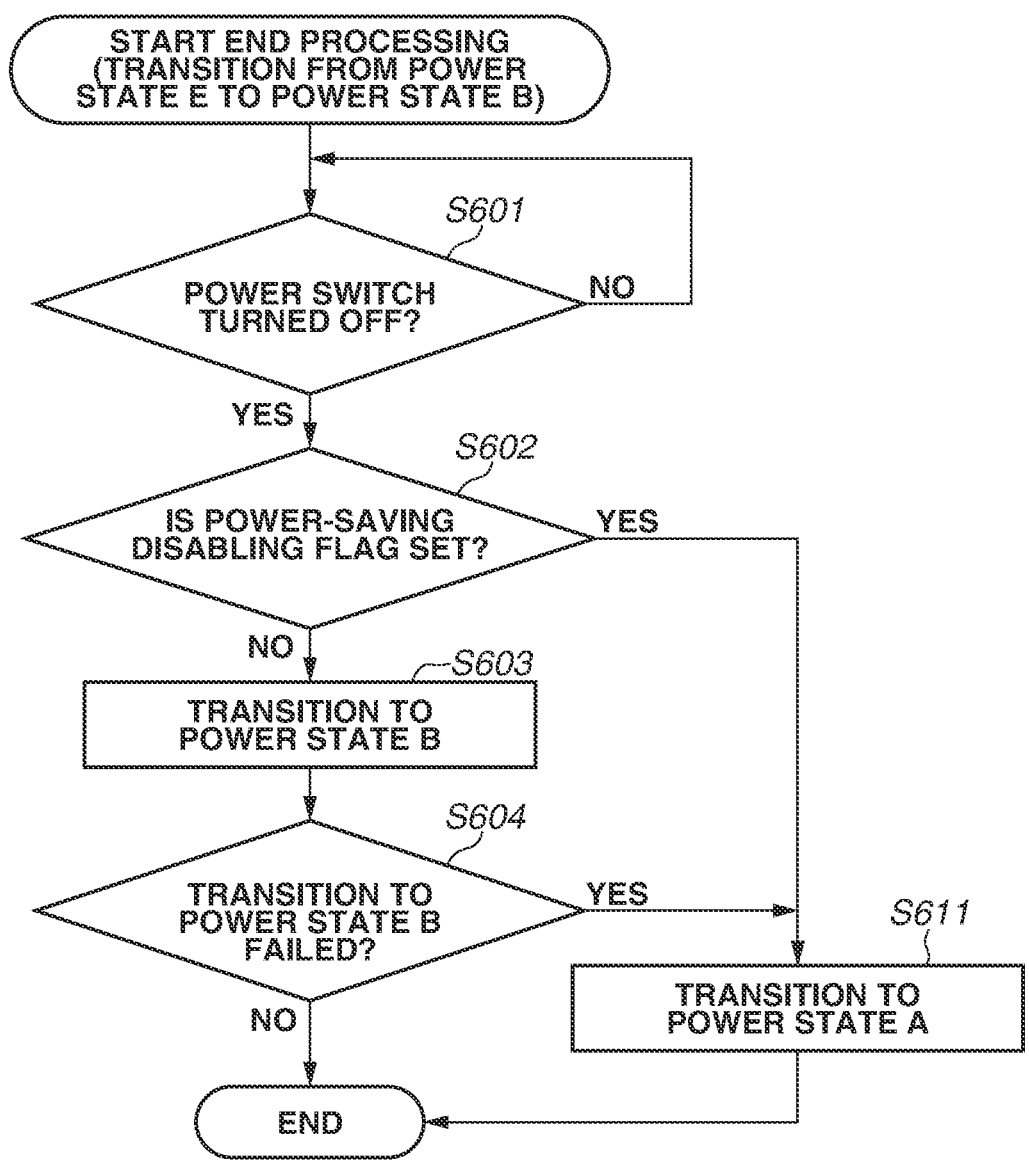
FIG. 6 is a flowchart illustrating an operation of the image forming apparatus according to the first exemplary embodiment.

FIGS. 5 and 6 are flowcharts illustrating examples of operations of the image forming apparatus 101 according to the first exemplary embodiment. These flowcharts represent the features of the present exemplary embodiment in the most direct way. For example, these pieces of processing are implemented when the CPU 340 loads a program stored in the HDD 106 into the memory 341 and then executes the program.

Descriptions will be made with reference to the flowchart in FIG. 5.

Processing illustrated in the flowchart in FIG. 5 corresponds to the deep sleep processing (a state transition from the power state D to the power state C). This processing is started by the CPU 340 with the start of the state transition from the power state D to the power state C (S432) as a trigger. This state transition corresponds to the sleep processing when a predetermined time period has elapsed since the end of printing or scanning or since the user ends operating the image forming apparatus 101.

In step S501, the CPU 340 checks whether the power-saving disabling flag is set.

The power-saving disabling flag is stored, for example, in the memory 341, and becomes unset, for example, when power of the image forming apparatus 101 is turned OFF.

When the power-saving disabling flag is set (YES in step S501), the CPU 340 does not make a state transition to the power state C. Then, the processing exits this flowchart.

On the other hand, when the power-saving disabling flag is unset (NO in step S501), then in step S502, the CPU 340 makes a state transition to the power state C.

In step S503, the CPU 340 checks whether the state transition to the power state C in step S502 fails. When the state transition to the power state C is successful (NO in step S503), the CPU 340 completes the state transition to the power state C. Then, the processing exits this flowchart.

On the other hand, when the state transition to the power state C in step S502 fails (YES in step S503), then in step S511, the CPU 340 sets the power-saving disabling flag. In step S512, the CPU 340 restores the power state to the power state D. Then, the processing exits this flowchart.

The flowchart in FIG. 6 will be described below.

Processing illustrated in the flowchart in FIG. 6 corresponds to the termination process (a state transition from the power state E to the power state B). This processing is started by the CPU 340 with the start of the state transition from the power state E to the power state B (S422) as a trigger. This state transition corresponds to a termination event started when the power switch 110 is turned OFF or when a termination notification is received from an application.

In step S601, the CPU 340 checks whether the power switch 110 (power SW) is turned OFF. The CPU 340 may check whether the power SW is turned OFF, by checking whether a termination notification is received from an application. When the power SW is not turned OFF (NO in step S601), the CPU 340 continues checking whether the power SW is OFF.

On the other hand, when the power SW is turned OFF (YES in step S601), the processing proceeds to step S602.

In step S602, the CPU 340 checks whether the power-saving disabling flag is set. When the power-saving disabling flag is set (YES in step S602), then in step S611, the CPU 340 makes a state transition to the power state A to shut down and enter the cold-off state. Accordingly, the image forming apparatus 101 shuts down and enters the cold-off state.

On the other hand, when the power-saving disabling flag is unset (NO in step S602), the processing proceeds to step S603.

In step S603, the CPU 340 starts a state transition to the power state B to perform suspend or hibernation.

In step S604, the CPU 340 checks whether the state transition to the power state B in step S603 fails. When the state transition to the power state B is successful (NO in step S604), the CPU 340 completes the state transition to the power state B. Then, the processing exits this flowchart.

On the other hand, when the state transition to the power state B in step S603 fails (YES in step S604), then in step S611, the CPU 340 and makes a state transition to the power state A to shut down and enter the cold-off state. Accordingly, the image forming apparatus 101 shuts down and enters the cold-off state.

When the state transition to the power state B in step S603 fails (YES in step S604), the CPU 340 may return to the former power state E.

The image forming apparatus 101 may fail in a state transition to the sleep mode. If an attempt is made to perform the termination process after the state transition to the sleep mode fails, a state transition to a high-speed activation mode such as suspend or hibernation will also fail. In the high-speed activation mode, the CPU 340 stops energizing the devices not to be used as restoration factors and disconnects the clock to provide lower power consumption than in the sleep mode. Therefore, according to the first exemplary embodiment, the image forming apparatus 101 inhibits a state transition to the power states C and B if a state transition to the power state C fails in the deep sleep processing. This enable preventing the repetition of retry on the state transition to the power states C and B, thus preventing an event that the operation state cannot be restored even upon reception of a return instruction from the user during retry processing. If the image forming apparatus 101 fails in the deep sleep processing as described above, the image forming apparatus 101 automatically shuts down without making a state transition to the power state B during the termination process. In the termination process, the image forming apparatus 101 originally makes a state transition to the power state B from which the CPU 340 can rapidly return in the high-speed activation mode. If the image forming apparatus 101 fails in the state transition to the power state B during the termination process, the image forming apparatus 101 also automatically shuts down. Therefore, the above-described configuration can guarantee that power is reliably turned OFF. As a result, even in a case where power-saving processing such as suspend or hibernation may possibly continuously fail, the present exemplary embodiment enables preventing the occurrence of an event that the power-saving processing is repeatedly retried, resulting in a prolonged user response time and incomplete processing. This also enables preventing an event that the operation state cannot be restored even upon reception of a return instruction from the user during power-saving retry processing.

In the processing in FIG. 6 according to the first exemplary embodiment, if suspend fails, the image forming apparatus 101 automatically shuts down to guarantee power off. In such a configuration according to the first exemplary embodiment, the image forming apparatus 101 shuts down without returning to the former power state. Therefore, logical data destruction may possibly occur if the termination process at the time of suspend performed by an application is different from the termination process at the time of shutdown. In contrast, in processing in FIG. 7 according to a second exemplary embodiment, if the image forming apparatus 101 fails in a state transition to the power state B, which corresponds to suspend, the image forming apparatus 101 once returns to the former power state E and then automatically makes a state transition to the power state A as the shutdown state. This allows an application to perform the termination process, enabling data protection.

Figure 7:
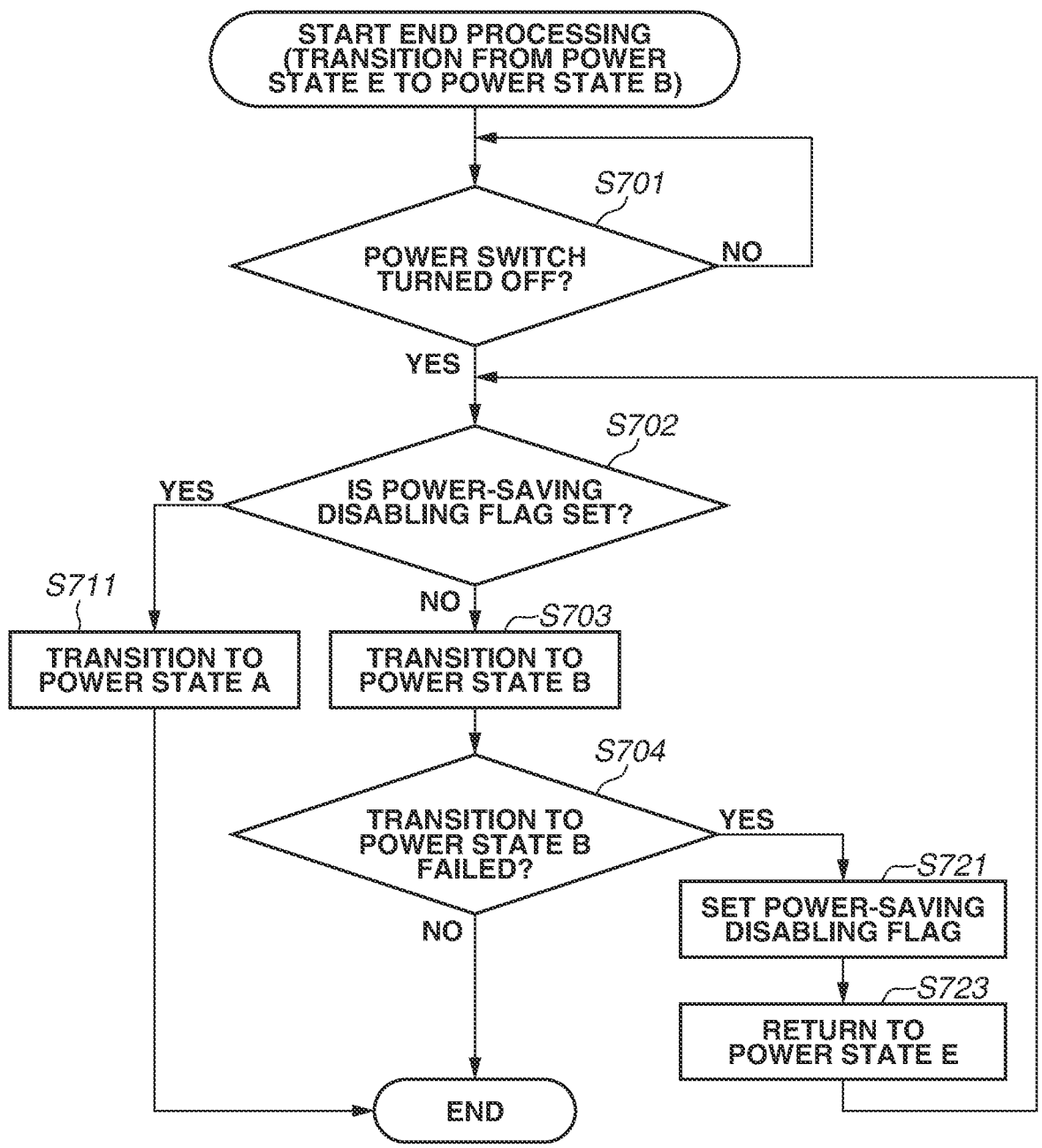
FIG. 7 is a flowchart illustrating an operation of an image forming apparatus according to a second exemplary embodiment.

FIG. 7 is a flowchart illustrating an example of the operation of the image forming apparatus 101 according to the second exemplary embodiment. This flowchart represents the features of the present exemplary embodiment in the most direct way. These pieces of processing are implemented when the CPU 340 loads a program stored in the HDD 106 into the memory 341 and then executes the program. Processing illustrated in the flowchart in FIG. 7 is started by the CPU 340 with the start of the state transition from the power state E to the power state B (S422) as a trigger. This state transition corresponds to a termination event started when the power switch 110 is turned OFF or when a termination notification is received from an application.

Processing in steps S701 to S704 and S711 is identical to the processing in steps S601 to S604 and S611 in FIG. 6, respectively, and redundant descriptions thereof will be omitted. Descriptions will be made centering on processing different from the processing in FIG. 6. According to the second exemplary embodiment, when the image forming apparatus 101 fails in the state transition to the power state B (YES in step S704), then in step S721, the CPU 340 sets the power-saving disabling flag. In step S723, the CPU 340 returns to the power state E. When the CPU 340 returns to the power state E, the CPU 340 continues the termination process since the termination notification has already been received. In step S702, the CPU 340 checks whether the power-saving disabling flag is set. In this case, since the power-saving disabling flag is set in step S721, the CPU 340 determines that the flag is set (YES in step S702). Then in step S711, the CPU 340 makes a state transition to the power state A. The CPU 340 once returns to the power state E as the former power state and then makes a state transition to the power state A as the shutdown state, making it possible to shut down after completing the application termination process. The power-saving disabling flag may be a flag for instructing the CPU 340 to make a state transition to the power state A.

According to the second exemplary embodiment, as described above, when the image forming apparatus 101 fails in the state transition to a power-saving state such as suspend, the CPU 340 once returns to the former power state to guarantee the shut down after completing the application termination process during the termination process. This allows the CPU 340 to complete the application termination process before shutting down, enabling data protection.

According to a third exemplary embodiment, if the image forming apparatus 101 fails in the sleep processing, the CPU 340 changes the setting values stored in the nonvolatile storage device to inhibit the sleep processing and the high-speed activation processing, and then issues a notification to the user. Conversely, if a phenomenon of failure to enter the power-saving mode is resolved through maintenance, the CPU 340 restores the setting values stored in the nonvolatile storage device to permit the sleep processing and the high-speed activation processing, and then issues a notification to the user. This configuration will be described below with reference to flowcharts.

Figure 8:
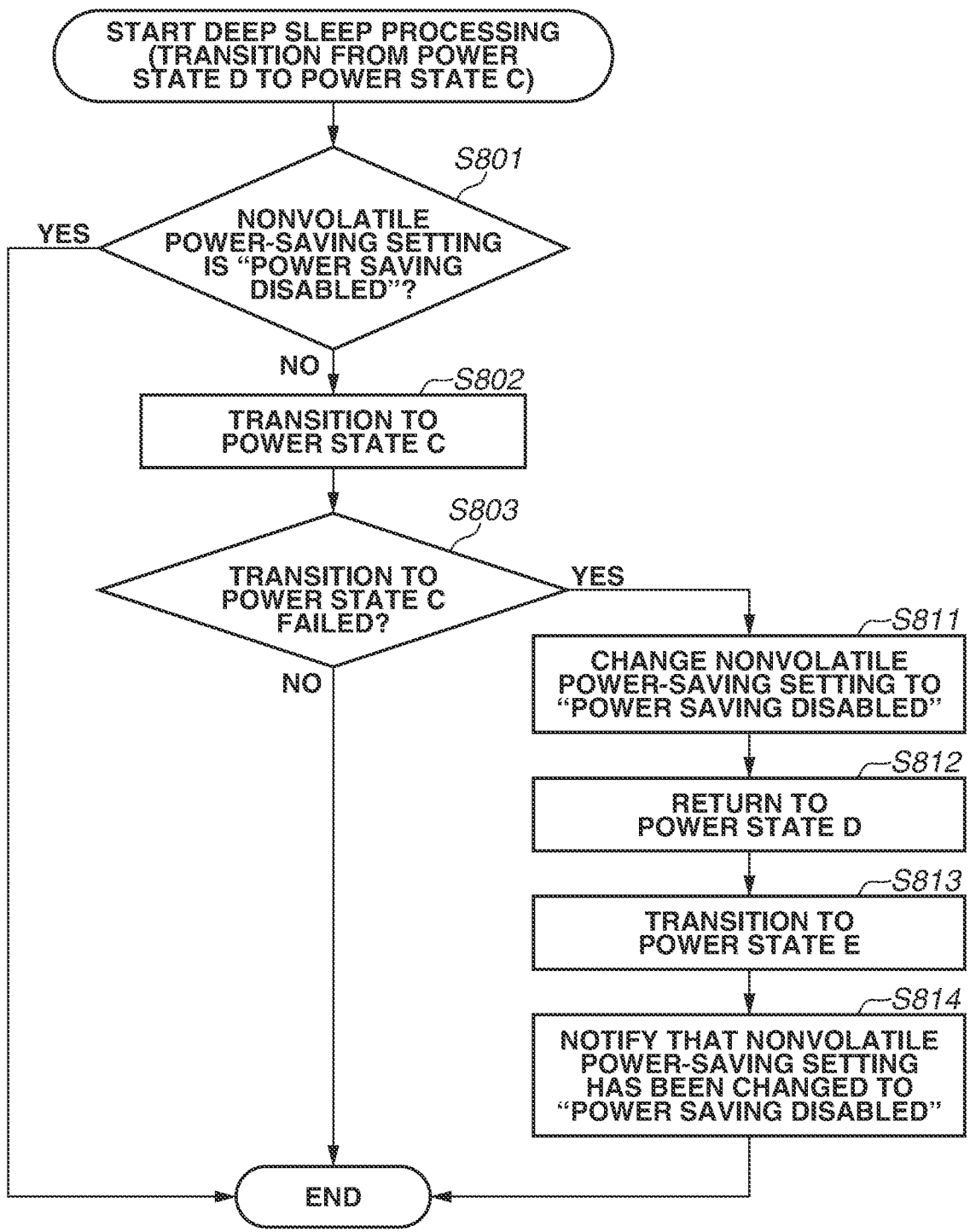
FIG. 8 is a flowchart illustrating an operation of an image forming apparatus according to a third exemplary embodiment.
Figure 9:
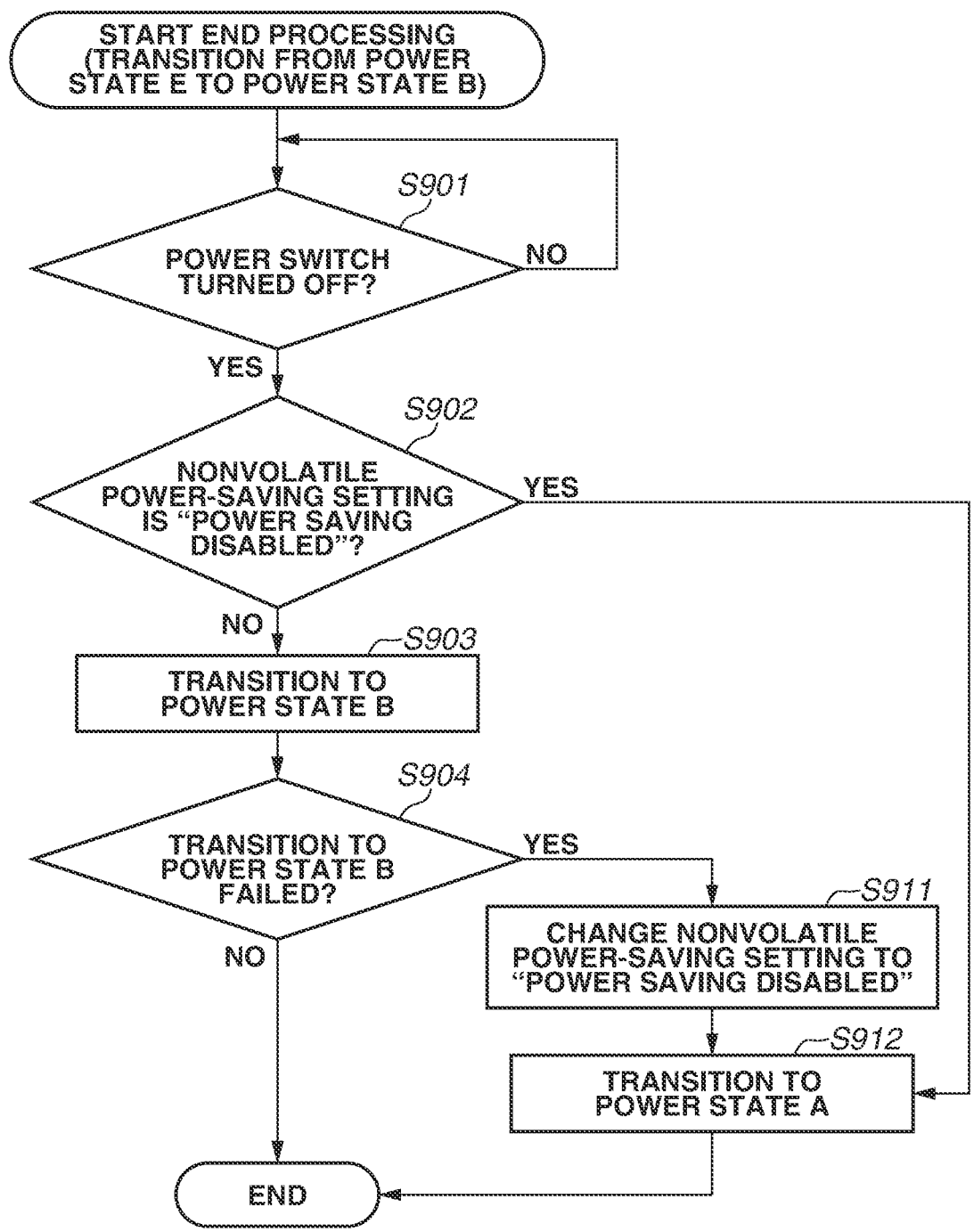
FIG. 9 is a flowchart illustrating an operation of the image forming apparatus according to the third exemplary embodiment.
Figure 10:
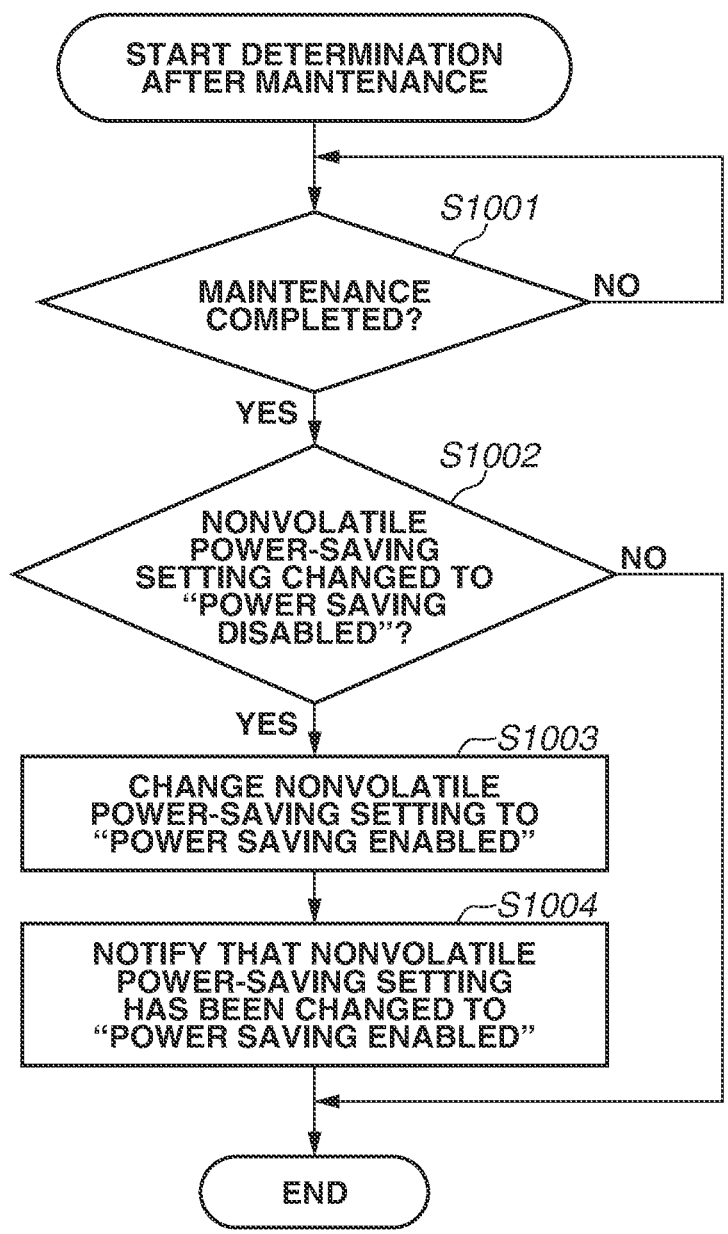
FIG. 10 is a flowchart illustrating an operation of the image forming apparatus according to the third exemplary embodiment.

FIGS. 8, 9, and 10 are flowcharts illustrating examples of operations of the image forming apparatus 101 according to the third exemplary embodiment. These flowcharts represent the features of the present exemplary embodiment in the most direct way. These pieces of processing are implemented when the CPU 340 loads a program stored in the HDD 106 into the memory 341 and then executes the program.

The flowchart in FIG. 8 will be described below.

Processing illustrated in the flowchart in FIG. 8 corresponds to the deep sleep processing (a state transition from the power state D to the power state C). This processing is started by the CPU 340 with the start of the state transition from the power state D to the power state C (S432) as a trigger. This state transition corresponds to the deep sleep processing when a predetermined time period has elapsed since the end of printing or scanning and since the user ends operating the image forming apparatus 101.

In step S801, the CPU 340 checks whether the power-saving setting stored in the nonvolatile storage device is "Power saving disabled". The power-saving setting is stored, for example, in the HDD 106 or the nonvolatile memory 205. Examples of power-saving setting to be stored include such setting information as "Power saving disabled" and "Power saving enabled".

When the power-saving setting is "Power saving disabled" (YES in step S801), the CPU 340 does not make a state transition to the power state C. Then, the processing exits this flowchart.

On the other hand, when the power-saving setting is "Power saving enabled" (NO in step S801), then in step S802, the CPU 340 starts a state transition to the power state C.

In step S803, the CPU 340 checks whether the CPU 340 fails in the state transition to the power state C in step S802. When the state transition to the power state C is successful (NO in step S803), the CPU 340 completes the state transition to the power state C. Then, the processing exits this flowchart.

On the other hand, when the state transition to the power state C in step S802 fails (YES in step S803), the processing proceeds to step S811.

In step S811, the CPU 340 changes the power-saving setting to "Power saving disabled".

In step S812, the CPU 340 returns to the power state D.

In step S813, the CPU 340 makes a state transition to the power state E. In step S814, the CPU 340 changes the display unit of the operation unit 105 from the non-display state by sleep to the display state and then notifies that the power-saving setting has been changed to "Power saving disabled" (for example, displayed on the display unit). Then, the processing exits this flowchart.

The notification method in steps S814 is not limited to the display on the display unit but includes a plurality of notification operations, such as a notification to an external server or a predetermined mail address, and recording or storing a failure to make a state transition to the power state C in a log. Any notification method is applicable as long as the user and service engineer can be notified of desirable information. However, detailed descriptions of this processing will be omitted since it is not the main subject.

The above-described data (power-saving setting) in the nonvolatile storage device may be loaded into a memory (e.g., the memory 341) and changed. If the data is stored in the nonvolatile storage device before the memory stops being energized, the data is retained. The CPU 340 does not necessarily need to write and read data to/from the nonvolatile storage device at the timing of accessing the power-saving setting in the nonvolatile storage device. However, descriptions of this processing will be omitted since it is not the main subject.

The flowchart in FIG. 9 will be described below.

Processing illustrated in the flowchart in FIG. 9 corresponds to the termination process (a state transition from the power state E to the power state B). This processing is started by the CPU 340 with the start of the state transition from the power state E to the power state B (S422) as a trigger. This state transition corresponds to a termination event started when the power switch 110 is turned OFF or when a termination notification is received from an application.

In step S901, the CPU 340 checks whether the power switch 110 (power SW) is turned OFF. The CPU 340 may check whether the power SW is turned OFF, by checking whether a termination notification is received from an application. When the power SW is not turned OFF (NO in step S901), the CPU 340 continues checking whether the power SW is turned OFF in step S901.

On the other hand, when the power SW is turned OFF (YES in step S901), the processing proceeds to step S902.

In step S902, the CPU 340 checks whether the power-saving setting stored in the nonvolatile storage device is "Power saving disabled". When the power-saving setting is "Power saving disabled" (YES in step S902), then in step S912, the CPU 340 makes a state transition to the power state A to shut down and enter the cold-off state.

On the other hand, when the power-saving setting is "Power saving enabled" (NO in step S902), then in step S903, the CPU 340 starts a state transition to the power state B to perform suspend or hibernation.

In step S904, the CPU 340 checks whether the state transition to the power state B in step S903 fails. When the state transition to the power state B is successful (NO in step S904), the CPU 340 completes the state transition to the power state B. Then, the processing exits this flowchart.

On the other hand, when the state transition to the power state B fails (YES in step S904), the processing proceeds to step S911.

In step S911, the CPU 340 changes the power-saving setting to "Power saving disabled".

In step S912, the CPU 340 makes a state transition to the power state A to shut down and enter the cold-off state. Like the second exemplary embodiment, the CPU 340 may once return to a former power state and then make a state transition to the power state A.

The flowchart in FIG. 10 will be described below.

The CPU 340 starts the processing of the flowchart in FIG. 10 upon detection of a maintenance operation. For example, the CPU 340 starts the processing upon detection, during the activation processing, that a hardware component such as a controller or the nonvolatile storage device has been replaced when power is OFF. For example, the CPU 340 starts the processing upon detection that the device maintenance is started or canceled. For example, the CPU 340 starts the processing upon detection that the working mode of the service engineer is canceled. For devices with a deactivation failure and a power state transition failure (steps S803 and S904), there is a plurality of timings and methods for detecting devices and their restorations in addition to the above-described ones. However, descriptions of this processing will be omitted since it is not the main subject. Referring to the flowchart in FIG. 10, the CPU 340 determines that the maintenance is completed when an event that resolves a phenomena of failure to make a state transition to the power-saving state occurs in the maintenance.

In step S1001, the CPU 340 determines whether the maintenance of the image forming apparatus 101 is completed. When the maintenance is not completed (NO in step S1001), the CPU 340 continues checking whether the maintenance is completed.

On the other hand, when the maintenance is completed (YES in step S1001), the processing proceeds to step S1002.

In step S1002, the CPU 340 checks whether the power-saving setting in the nonvolatile storage device is changed to "Power saving disabled" (processing in steps S811 and S911 is performed). When the power-saving setting is not changed to "Power saving disabled" (NO in step S1002), the processing exits this flowchart.

On the other hand, when the power-saving setting is changed to "Power saving disabled" (YES in step S1002), then in step S1003, the CPU 340 changes the power-saving setting in the nonvolatile storage device to "Power saving enabled". In step S1004, the CPU 340 notifies that the power-saving setting is changed to "Power saving enabled".

The notification method in steps S1004 is not limited to the display on the display unit of the operation unit 105 but includes a plurality of notification operations, such as a notification to an external server and recording or storing of failures. However, descriptions of the notification method will be omitted since it is not the main subject.

During a power-saving change operation, when the user is changing the power-saving setting from the operation unit 105 or the computer 109, the CPU 340 can mask the power-saving setting to prevent it from being changed, and then notify the user when the power-saving setting is about to be changed. However, descriptions of this processing will be omitted since it is not the main subject.

According to the third exemplary embodiment, if the image forming apparatus 101 fails in the state transition to a power-saving state such as suspend, the image forming apparatus 101 can disable the power-saving setting to inhibit the state transition to a power-saving state such as suspend, and then notify the user of the inhibition. Conversely, if a phenomenon of failure to enter the power-saving mode is resolved through maintenance, the CPU 340 can enable the power-saving setting to permit the state transition to a power-saving state such as suspend, and then notify the user of the permission.

If a device failure occurs during processing for entering a power-saving state such as suspend (suspend processing) or return processing (resume processing), the suspend processing or resume processing may fail, and a watchdog timer reset (hereinafter referred to as "WDT reset") may occur. In this case, a fourth exemplary embodiment disables the power-saving setting to prevent the state transition to the power-saving state, and operates in a fail-safe mode. This configuration will be described below with reference to flowcharts.

Figure 11:
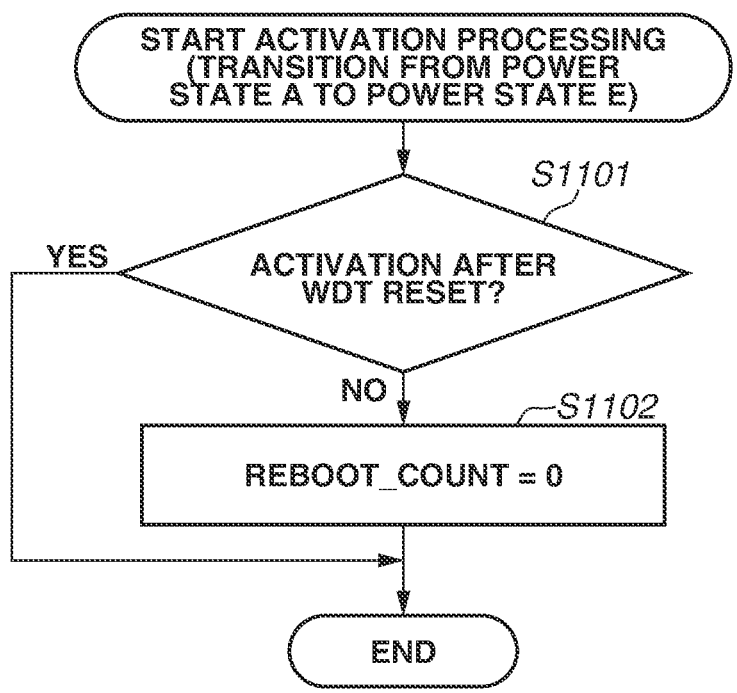
FIG. 11 is a flowchart illustrating an operation of an image forming apparatus according to a fourth exemplary embodiment.
Figure 12:
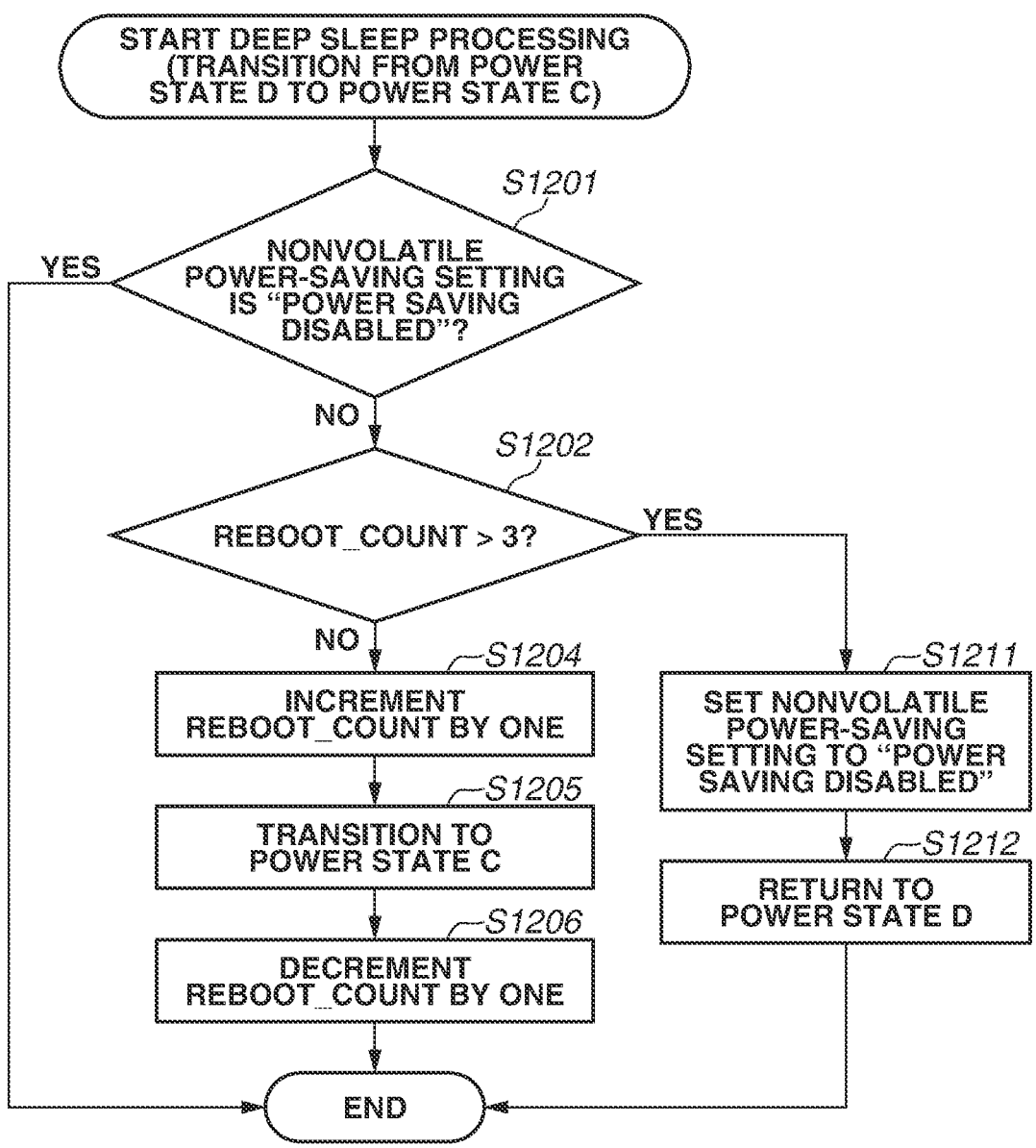
FIG. 12 is a flowchart illustrating an operation of the image forming apparatus according to the fourth exemplary embodiment.
Figure 13:
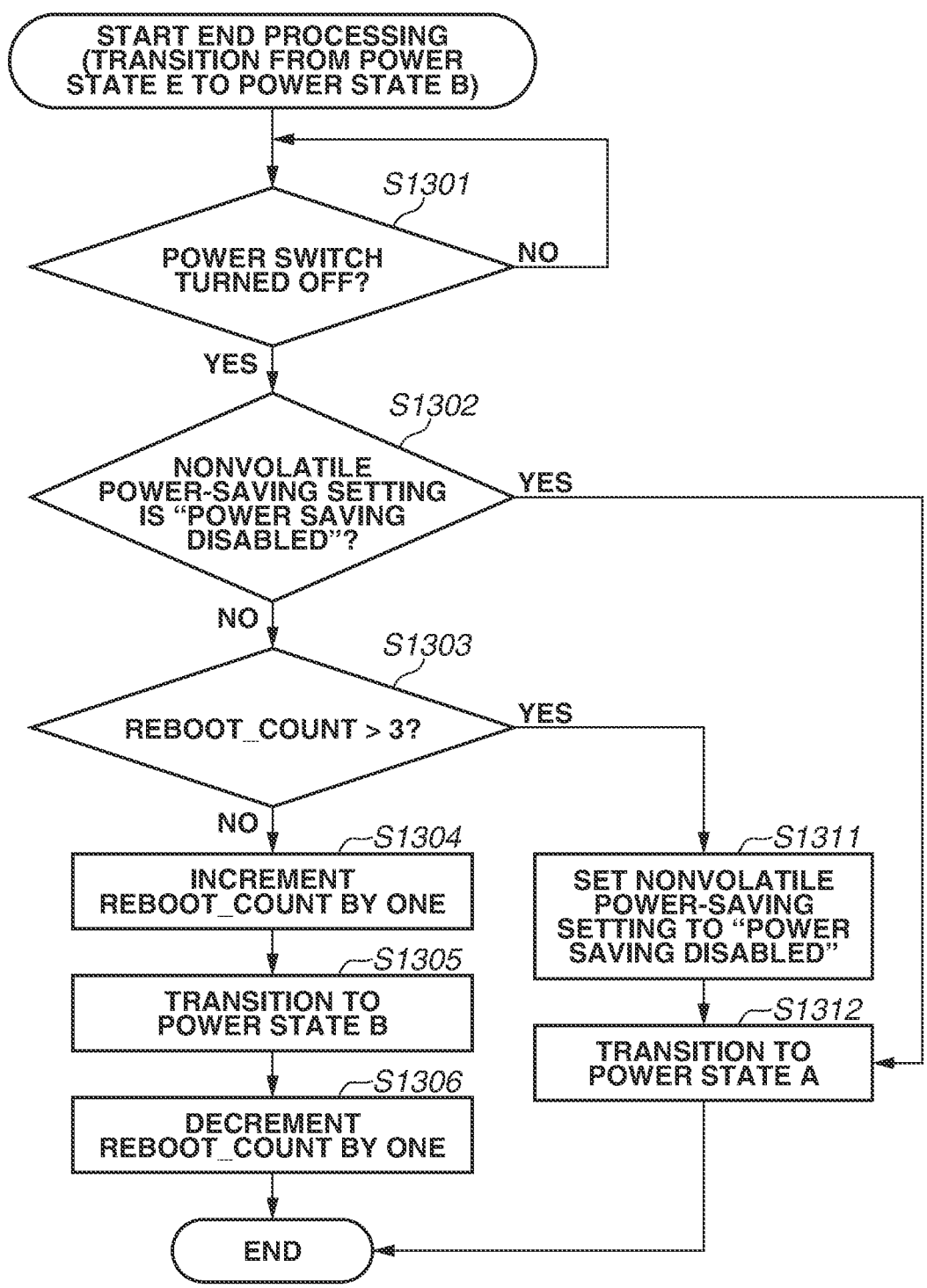
FIG. 13 is a flowchart illustrating an operation of the image forming apparatus according to the fourth exemplary embodiment.

FIGS. 11, 12, and 13 are flowcharts illustrating examples of operations of the image forming apparatus 101 according to the fourth exemplary embodiment. These flowcharts represent the features of the present exemplary embodiment in the most direct way. These pieces of processing are implemented when the CPU 340 loads a program stored in the HDD 106 into the memory 341 and then executes the program.

The flowchart in FIG. 11 will be described below.

The CPU 340 makes a state transition from the power state A called a power-off or cold-off state to the power state E called a power-on or standby state. More specifically, the CPU 340 starts the activation processing.

In step S1101, during the activation of the image forming apparatus 101, the CPU 340 determines whether the present activation is activation after the WDT reset. When the present activation is activation after the WDT reset (YES in step S1101), the CPU 340 activates the image forming apparatus 101.

On the other hand, when the present activation is not activation after the WDT reset (NO in step S1101), then in step S1102, the CPU 340 sets the value of variable REBOOT_COUNT representing the number of times of the WDT reboot to "0". REBOOT_COUNT is stored, for example, in the HDD 106 or the nonvolatile memory 205.

The flowchart in FIG. 12 will be described below.

The CPU 340 makes a state transition from the power state D as a light sleep state to the power state C as suspend or the deep sleep state in which power of peripheral devices is turned OFF and the CPU 340 is in the Wait For Interrupt (WFI) state. More specifically, the CPU 340 starts the deep sleep processing.

When the deep sleep processing starts, then in step S1201, the CPU 340 checks whether the power-saving setting in the nonvolatile storage device is "Power saving disabled". When the power-saving setting is "Power saving disabled" (YES in step S1201), the CPU 340 does not make a state transition to the power-saving state and hence does not repeat the WDT reset. Then, the processing exits this flowchart.

On the other hand, when the power-saving setting is not "Power saving disabled" (NO in step S1201), the CPU 340 continues the processing. Then, the processing proceeds to step S1202.

In step S1202, the CPU 340 checks whether REBOOT_COUNT is larger than 3. When REBOOT_COUNT is not larger than 3 (NO in step S1202), the CPU 340 determines that the WDT reset has not been repeated a number of times. In step S1204, the CPU 340 increments REBOOT_COUNT by one.

In step S1205, the CPU 340 continues making a state transition to the power state C as the deep sleep state. The state transition to the power state C may be completed when the CPU 340 makes a state transition to the power state C as the deep sleep state in step S1205. The state transition to the power state E as resume processing or the state transition to the light sleep state may be completed upon reception of an event of restoration from the power-saving mode.

However, descriptions of this processing will be omitted since it is not the main subject.

When the processing in steps S1205 is completed, i.e., when power-saving processing such as suspend is successful, then in step S1206, the CPU 340 decrements REBOOT_COUNT by one. This means that, if the CPU 340 fails in power-saving processing such as suspend because of a device failure, and the WDT reset is performed, REBOOT_COUNT remains incremented by one.

When REBOOT_COUNT is larger than 3 (YES in step S1202), then in step S1211, the CPU 340 determines that the WDT reset has been repeated a number of times, and sets the power-saving setting in the nonvolatile storage device to "Power saving disabled".

In step S1212, the CPU 340 returns to the power state D as the light sleep state.

The flowchart in FIG. 13 will be described below.

Processing illustrated in the flowchart in FIG. 13 corresponds to the termination process (a state transition from the power state E to the power state B). This processing is started by the CPU 340 with the start of the state transition from the power state E to the power state B (S422) as a trigger. This state transition corresponds to a termination event started when the power switch 110 is turned OFF or when a termination notification is received from an application.

In step S1301, the CPU 340 checks whether the power switch 110 (power SW) is turned OFF. The CPU 340 may check whether the power SW is turned OFF, by checking whether a termination notification is received from an application. When the power SW is not turned OFF (NO in step S1301), the CPU 340 continues checking whether the power SW is turned OFF.

On the other hand, when the power SW is turned OFF (YES in step S1301), the processing proceeds to step S1302.

In step S1302, the CPU 340 checks whether the power-saving disabling flag is set. When the power-saving disabling flag is set (YES in step S1302), then in step S1312, the CPU 340 makes a state transition to the power state A to shut down and enter the cold-off state. Accordingly, the image forming apparatus 101 shuts down and enters the cold-off state.

On the other hand, when the power-saving disabling flag is unset (NO in step S1302), then in step S1303, the CPU 340 checks whether REBOOT_COUNT is larger than 3.

When REBOOT_COUNT is not larger than 3 (NO in step S1302), then in step S1304, the CPU 340 determines that the WDT reset has not been repeated a number of times and increments REBOOT_COUNT by one.

In step S1305, the CPU 340 continues making a state transition to the power state B to perform suspend or hibernation. The state transition to the power state B may be completed when the CPU 340 makes a state transition to the power state B (in step S1305). The state transition to the power state E as the resume processing may be completed when the power switch is turned ON. However, descriptions of this processing will be omitted since it is not the main subject.

When the processing in steps S1305 is completed, i.e., when power-saving processing such as suspend or hibernation is successful, then in step S1306, the CPU 340 decrements REBOOT_COUNT by one. This means that, if the CPU 340 fails in power-saving processing such as suspend because of a device failure, and the WDT reset is performed, REBOOT_COUNT remains incremented by one.

When REBOOT_COUNT is larger than 3 (YES in step S1303), then in step S1311, the CPU 340 determines that the WDT reset has been repeated a number of times and then sets the power-saving setting to "Power saving disabled".

In step S1312, the CPU 340 makes a state transition to the power state A as the power-off and cold-off states.

The CPU 340 sets REBOOT_COUNT to 3 since the CPU 340 determines that the WDT reset has been repeated a number of times. However, the CPU 340 can optionally change the number of times. More specifically, the CPU 340 needs to be configured to determine that the WDT reset has been repeated if suspend fails a predetermined number of times.

REBOOT_COUNT is used in a similar way in both the deep sleep processing (state transition from the power state D to the power state C) and the termination process (state transition from the power state E to the power state B) that enables high-speed activation. The number of times of continuous WDT activation can also be confirmed by using different variables. However, descriptions of this processing will be omitted since it is not the main subject.

The fourth exemplary embodiment may perform the processing illustrated in FIG. 10 like the third exemplary embodiment. More specifically, if a phenomenon of failure to enter the power-saving mode is resolved through maintenance, the CPU 340 may enable the power-saving setting to permit the state transition to a power-saving state such as suspend. When the state transition to a power-saving state such as suspend is inhibited or permitted, the CPU 340 may inform the user of the inhibition or permission like third exemplary embodiment.

According to the fourth exemplary embodiment, as described above, if the image forming apparatus 101 is reset with the watchdog timer a number of times at the time of the state transition to the power-saving state, the CPU 340 can inhibit the state transition to the power-saving state and operate in the fail-safe mode.

The above-described exemplary embodiments enable solving problems caused by continuous failures of power-saving processing such as suspend. For example, the exemplary embodiments enable preventing the occurrence of an event that the operating state cannot be restored even upon issuance of a return instruction from the user during retry of the power-saving processing and an event that the power-saving processing does not end. This makes it possible to improve usability.

While the present disclosure has specifically been described above based on the above-described various data configurations and contents, the present disclosure is not limited thereto but it is needless to say that diverse data configurations and contents are applicable according to applications and purposes.

Although the present disclosure has been described above based on an exemplary embodiment, the present disclosure can be embodied, for example, as a system, an apparatus, a method, a program, or a storage medium. More specifically, the present disclosure is applicable to a system composed of a plurality of devices and to an apparatus composed of one device.

Further, all of configurations derived by suitably combining the above-described exemplary embodiments are also intended to be included in the present disclosure.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-070113, filed Apr. 21, 2022, which is hereby incorporated by reference herein in its entirety.

What is claimed is:

1. An information processing apparatus for making state transition between a plurality of power states including a suspend state, the information processing apparatus comprising one or more controllers having one or more processors and one or more memories, the one or more controllers being configured to function as:
    a control unit configured to, in a case where a state transition to the suspend state fails a predetermined number of times, inhibit the state transition to the suspend state and then perform a shutdown.

2. The information processing apparatus according to claim 1, wherein, in a case where the state transition to the suspend state fails, the control unit once restores a former power state before performing a shutdown.

3. The information processing apparatus according to claim 1,
    wherein the plurality of power states includes at least the suspend state and a sleep state,
    wherein the one or more controllers are configured to function as:
    a setting unit configured to, in a case where a state transition from the sleep state to the suspend state fails, inhibit the state transition to the suspend state, and
    wherein, in a case where the state transition to the suspend state is inhibited, the control unit performs a shutdown.

4. The information processing apparatus according to claim 1,
    wherein the plurality of power states includes at least the suspend state a normal state,
    wherein the one or more controllers are configured to function as:
    a setting unit configured to, in a case where a state transition from the normal mode to the suspend state fails, inhibit the state transition to the suspend state, and
    wherein, in a case where the state transition to the suspend state is inhibited, the control unit performs a shutdown.

5. The information processing apparatus according to claim 1, wherein the control unit permits the state transition to the suspend state in a case where a predetermined maintenance is performed.

6. The information processing apparatus according to claim 5, wherein one or more controllers are configured to function as:
- a notification unit configured to, in a case where the state transition to the suspend state is inhibited or permitted, inform of the inhibition or permission, respectively.

7. The information processing apparatus according to claim 1, wherein the number of times the state transition to the suspend state fails is initialized upon an activation different from a watchdog timer reset.

8. A method for controlling an information processing apparatus for making a state transition between a plurality of power states including a suspend state, the method comprising performing, in a case where a state transition to the suspend state fails a predetermined number of times, inhibit the state transition to the suspend state and then perform a shutdown.

9. A method for controlling an information processing apparatus for making a state transition between a plurality of power states including a suspend state, the method comprising:
- inhibiting a state transition to the suspend state in a case where the state transition to the suspend state fails a predetermined number of times; and
- permitting the state transition to the suspend state in a case where a predetermined maintenance is performed.

* * * * *